United States Patent [19]

Ohgushi et al.

[11] Patent Number: 4,564,557
[45] Date of Patent: Jan. 14, 1986

[54] THERMOSET ACRYLIC RESIN COMPOSITION FOR COATING METALLIC MATERIALS AND STAINLESS STEEL COATED WITH THE COMPOSITION

[75] Inventors: Masuhito Ohgushi; Hiroshi Ohtsuka; Tsutomu Asaba, all of Yokohamashi; Hironobu Hoshi, Tokyoto; Kenichi Goshokubo, Nakakubikigun; Takeo Wakui, Kashiwashi; Kiminori Ishii, Ebinashi; Masashi Ohno, Hatanoshi; Yukio Okada, Fujisawashi, all of Japan

[73] Assignee: Chisso Corporation, Osaka, Japan

[21] Appl. No.: 719,429

[22] Filed: Apr. 3, 1985

[30] Foreign Application Priority Data

Apr. 14, 1984 [JP] Japan ................................ 59-75375
Sep. 25, 1984 [JP] Japan ................................ 59-199775

[51] Int. Cl.$^4$ ................ B32B 27/38; B32B 9/04; C08F 24/00; C08F 30/08
[52] U.S. Cl. .................... 428/333; 427/388.2; 428/413; 428/447; 428/463; 428/626; 526/273; 526/279; 526/328.5; 526/329.6; 526/320; 526/329.7
[58] Field of Search ............... 526/328.5, 329.6, 329.7, 526/320, 273, 279; 428/413, 333, 447, 463, 626; 427/388.2

[56] References Cited

U.S. PATENT DOCUMENTS

| | | | |
|---|---|---|---|
| 3,997,694 | 12/1976 | Wu | 428/463 X |
| 4,125,670 | 11/1978 | Perfetti et al. | 428/626 |
| 4,160,056 | 7/1979 | Tanaka et al. | 428/220 |
| 4,177,323 | 12/1979 | Obi et al. | 428/622 |
| 4,291,135 | 9/1981 | Höhlein et al. | 525/101 |
| 4,371,664 | 2/1983 | Kato et al. | 526/279 X |
| 4,414,375 | 11/1983 | Neefe | 526/273 X |
| 4,478,990 | 10/1984 | Kohno et al. | 526/279 |
| 4,486,504 | 12/1984 | Chung | 526/279 X |
| 4,491,650 | 1/1985 | Rizk et al. | 526/279 X |

Primary Examiner—Thurman K. Page
Attorney, Agent, or Firm—Fred Philpitt

[57] ABSTRACT

A thermoset acrylic resin composition for coating metallic materials, particularly stainless steel, having a superior adhesion thereonto and hence a superior resistance to forming after coated, and a stainless steel piece coated with a coating material comprising the above composition, followed by baking, and having a superior colorability and endurability, are provided, which composition is obtained by radical-copolymerizing (a) an acrylic or methacrylic acid ester having 1-12 C in the ester moiety, in 40-80% by weight, (b) a hydroxyl group- or epoxy group-containing acrylic or methacrylic acid ester, in 20-5% by weight, (c) a vinyl group-containing polysiloxane in 20-0.01% by weight and (d) a vinyl group-containing silane compound in 20-2% by weight, these % by weight being based on the total weight of monomers (a)-(d).

9 Claims, 1 Drawing Figure

FIG. 1

THERMOSET ACRYLIC RESIN COMPOSITION FOR COATING METALLIC MATERIALS AND STAINLESS STEEL COATED WITH THE COMPOSITION

BACKGROUND OF THE INVENTION

1. Field of the Invention

This invention relates to an acrylic resin composition for coating metallic materials. More particularly it relates to the above composition obtained by copolymerizing specified acrylic acid esters or methacrylic acid esters, vinyl group-containing polysiloxane and vinyl group-containing silane compound each in a specified proportion.

This invention further relates to a decorative stainless steel piece coated with a modified acrylic resin. More particularly it relates to a decorative stainless steel piece coated with a coating material comprising a modified resin as an active ingredient obtained by copolymerizing an acrylic acid ester or a methacrylic acid ester and further as modifying monomers, a vinyl group-containing alkoxysilane, a vinyl group-containing polysiloxane and a hydroxyl group or epoxy group-containing acrylic acid ester or methacrylic acid ester.

2. Description of the Prior Art

Known thermoset acrylic resin compositions have been broadly used as coating material for various metals such as iron, aluminum, copper and stainless steel since the compositions afford a coating which is superior in luster, transparency, hardness, weather resistance, chemical resistance and other properties. However, the coating therefrom has an insufficient adhesion to metals; hence it is impossible to endure such a forming processing as bending processing through 0°–2° to 180°. In order to impart such a bending resistance to the coating, it is necessary to blend an agent for imparting bending resistance to the thermoset acrylic resin composition. However, such a blending is accompanied with reduction in at least one of the physical properties such as hardness, chemical resistance, hot water resistance and other properties of the above coating. Thus, in order to avoid such reduction in physical properties and yet obtain a bending-processed, formed product coated with a thermoset acrylic resin composition, it is the present status that the bending-processed, formed product is post-coated with the resin composition.

However, if a coating material (a thermoset acrylic resin composition) is present which endures the above bending processing after coated, then it is possible to produce various fabricated products such as domestic appliances, office machines, building materials, etc. by the use of the so-called precoat sheet obtained by coating such a coating material onto metallic sheets. When such a precoat sheet is utilized, it is possible to remove technical difficulties at the time of coating, make the operational environment non-pollutitive and effect energy-saving, as compared with the case where individual formed products are coated; hence the above coating material which endures the bending processing has been desired.

Further, stainless steel materials, particularly stainless steel sheet, steel band, steel pipe, etc. surface-adjusted by BA (Bright Annealing), buffing, hairline polishing, etc. so as to retain their planished surfaces are characterized by endurability and metallic luster; hence these forming-processed products have been broadly used for interior and exterior parts for automobiles using trim, emblem, stainless foil, etc. for automobiles, interior and exterior building materials, furnitures, domestic appliances, etc. However, such stainless steel materials even if surface-adjusted, have raised such problems that the products are liable to cause rust or contamination, and the shade of the steel materials is limited only to the color of the stainless steel itself whereby they are restricted in the aspect of decorative properties.

For the purpose of decoration, rust prevention and contamination prevention of stainless steel materials, the materials sometimes are coated with an acrylic resin paint while making the most of the metallic luster of stainless steel. However, in the case where the coating formed from such a paint is required to have transparency and high hardness, instead softness and adhesion are sacrificed; thus when such a stainless steel material having a high hardness coating is subjected to forming such as press processing or roll processing, it raises such drawbacks that cracks occur on the coating or the coating peels off. Further, since such a coating is insufficient in salt resistance, alkali resistance and weather resistance, the uses of stainless steel materials having the high hardness acrylic resin coating have been restricted to indoor uses where the quantity of UV light is small.

As to the coloration of the surface of stainless steel materials, there is a method of forming a coating having a thickness of from 500 to 10000 Å by way of anodic oxidation on the surface of the materials, to develop color on the surface through interference of natural light and reflected light (which method will hereinafter be abbreviated to "oxidation method"). However, the steel materials according to this color development method have the following drawbacks: discoloration of the processed surface of stainless steel materials, change in color tone depending on the view direction or adhesion of oil or the like and high production cost due to the treating technique. Thus this method has been applied only to extremely restricted uses. Accordingly, it has been practically very difficult to effect a transparent coloration on the surface of stainless steel material while retaining the metallic luster of the materials thereon and at the same time impart rust resistance.

In view of the foregoing technical situations, the present inventors have made extensive research in order to find a thermoset acrylic resin composition having superior forming processability after coated, and as a result have found that copolymer compositions obtained by subjecting to radical copolymerization, (a) an alkyl acrylate or an alkyl methacrylate, (b) a hydroxyl group- or epoxy group-containing acrylic acid ester, (c), a vinyl group-containing polysiloxane and (d) a vinyl group-containing silane compound, each having a definite range of carbon atoms and a definite proportion are suitable to the above-mentioned objects.

Further the present inventors have made extensive research in order to solve the problems of the prior art relative to stainless steel materials, and as a result have found that when a coating material comprising a silicone resin-modified acrylic resin as an active ingredient is coated on stainless steel materials, followed by baking, then there is obtained a siloxane bond-containing resin coating on the surface of the materials. Further it has been found that this coating does not have the above various drawbacks due to conventional acrylic resin coating materials; it is possible to blend a pigment which can bring about a desired coloration; and there is no defect of the above coating by way of anodic oxidization.

As is apparent from the foregoing, an object of the present invention is to provide a thermoset acrylic resin composition for coating metals which causes neither peeling-off nor blushing due to bending processing and is usable for coated metal sheets.

Another object of the present invention is to provide a decorative stainless steel piece coated with a modified acrylic resin, having a superior colorability and endurability.

SUMMARY OF THE INVENTION

The present invention in a first aspect has the following main constitution (1) and constitutions as embodiments (2)–(5).

Further the present invention in a second aspect has the follown g main constitution (6) and constitutions as embodiments (7)–(9).

(1) A thermoset acrylic resin composition for coating metallic materials, obtained by subjecting to radical copolymerization, the following monomers (a)–(d), each specified and each in a definite proportion by weight based on the total weight of the monomers (a)–(d):

(a) at least one of compounds selected from the group consisting of acrylic acid esters and methacrylic acid esters, both the esters having 1 to 12 carbon atoms in the ester group moiety, in a proportion of 40 to 80% by weight;

(b) at least one of compounds selected from the group consisting of hydroxyl group- or epoxy group-containing acrylic acid esters and hydroxyl group- or epoxy group-containing methacrylic acid esters, each in a proportion of 20 to 5% by weight;

(c) a vinyl group-containing polysiloxane in a proportion of 20 to 0.01% by weight; and (d) a vinyl group-contaning silane compound in a proportion of 20 to 2% by weight.

(2) A composition according to the above item (1) wherein 0.1 to 5% by weight of an organic acid having 3 or more carbon atoms is further blended with the mixture of said monomers.

(3) A composition according to the above item (1) wherein the copolymer obtained by the radical copolymerization has a weight average molecular weight of 5,000 to 300,000.

(4) A composition according to the above item (2) wherein said organic acid is acrylic acid or maleic anhydride.

(5) A composition according to the above item (1) wherein said vinyl group-containing polysiloxane is at least one of compounds selected from the group consisting of the following monomers (e)–(h):

(e) vinyl group-terminated polyalkylsiloxanes having a viscosity at 25° C. ($\eta$) of 2 to 100,000 cp and the following structural formula:

wherein n represents a positive integer;

(f) polydimethyl-polymethylvinylsiloxane copolymers having a $\eta$ of 10 to 100,000 cp at 25° C. and the following structural formula:

wherein m and n each represent a positive integer;

(g) methacryloxpropyl group-terminated polydimethylsiloxanes having a viscosity at 25° C. ($\eta$) of 5 to 100,000 cp at 25° C. and the following structural formula:

wherein n represents a positive integer;

(h) polydimethyl-methacryloxpropylmethylsiloxanes having a viscosity at 25° C. ($\eta$) of 10 to 100,000 cp at 25° C. and the following structural formula:

wherein n represents a positive integer; and compounds having phenyl group substituted for a part of —(CH$_3$)$_2$ in Si—(CH$_3$)$_2$ group in said (e)–(h).

(6) A stainless steel piece having thereon a coating comprising a modified acrylic resin as an active ingredient, prepared by subjecting to radical copolymerization, ① 20 to 2% by weight of a vinyl group-containing alkoxysilane, ② 20 to 0.01% by weight of a vinyl group-containing polysiloxane, ③ 20 to 5% by weight of a hydroxyl group- or epoxy group-containing acrylic acid ester or methacrylic acid ester and 40 to 80% by weight of ④ an acrylic acid ester having 1 to 12 carbon atoms in the ester group moiety or ⑤ a methacrylic acid ester having 1 to 12 carbon atoms in the ester group moiety, in the presence of 0.1 to 5% be weight of an organic acid having 3 or more carbon atoms, the respective % by weight being based on the total weight of the monomers ① – ⑤ , and baked at a temperature of 100° to 350° C.

(7) A stainless steel piece according to the above item (6) wherein said coating has a thickness of 1 to 30μ.

(8) A stainless steel piece according to the above item (6) wherein a pigment having an average particle diameter of 2μ or less is contained in said coating.

(9) A stainless steel piece according to the above item (6) wherein the coating after forming-processed is again baked at a temperature of 100° to 300° C.

DETAILED DESCRIPTION OF THE PREFERRED EMBODIMENTS

The constitution and effectiveness of the present invention will be described below in more detail.

The composition of the present invention is obtained by subjecting monomers of the following four groups (a)–(d) to radical copolymerization:

As the compounds of group (a), acrylic acid esters having 1 to 12 carbon atoms in the ester group moiety or methacrylic acid esters having 1 to 12 carbon atoms in the ester group moiety are used in a proportion of 40 to 80% by weight based on the total weight of the monomers (a)–(d). Concrete examples of these esters are acrylates such as ethyl acrylate or butyl acrylate and methacrylates such as methyl methacrylate, ethyl methacrylate or butyl methacrylate. If these acrylates or methacrylates have 13 or more carbon atoms in tha alkyl group moiety, the physical properties thereof as a coating material relative to final products are insufficient. This applies also to the case where their amounts used are less than 40% by weight or exceed 80% by weight.

Next, as for the compounds of group (b), hydroxyl group- or epoxy group-containing acrylic acid esters or hydroxyl group- or epoxy group-containing methacrylic acid esters are used in a proportion of 20 to 5% by weight based on the total weight of monomers used for the composition. Concrete examples of these esters are 2-hydroxyethyl acrylate, 2-hydroxyethyl methacrylate and glycidyl methacrylate. If the proportion of the compounds of group (b) used exceeds 20% by weight, there is a fear that the physical properties of the coating prepared from the resulting final composition are inferior, while if it is less than 5% by weight, the curability of the final composition is insufficient.

Next, as for the compounds of group (c), vinyl group-containing polysiloxanes are used in a proportion of 20 to 0.01% by weight based on the total weight of the monomers used for the composition. The vinyl group may be bonded in the form of the terminal group of the polysiloxanes or may be bonded directly to Si atom in the repetition units of the polysiloxanes or bonded thereto by the medium of another functional group. If the proportion of the polysiloxanes used exceeds 20% by weight, the resulting coating is too soft and also poor in adhesion, while if it is less than 0.01% by weight, the physical properties of the coating are insufficient. Concrete examples of the polysiloxanes are the compounds (e)–(h) described in the above item (5). As to the $\eta$ of these compounds, those in the above respective ranges of numeral values are preferably used.

Finally, as for the compounds of group (d), vinyl group-containing silane compounds are used in a proportion of 20 to 2% by weight based on the total weight of the monomers used for the composition. The silane compounds have two or three hydrolyzable functional groups bonded directly to Si atom besides the above vinyl group. While these functional groups are not limited, alkoxy groups having 1 to 4 carbon atoms are easily used and afford preferable results. Concrete examples of such vinyl group-containing silane compounds are vinyltrimethoxysilane, vinyltriethoxysilane, vinyldimethoxyethoxysilane, methylvinyldimethoxysilane, methylvinyldiethoxysilane, $\gamma$-methacryloxypropyltrimethoxysilane and $\gamma$-methacryloxypropylmethyldimethoxysilane.

The above monomers of groups (a)–(d) are copolymerized in the presence of a radical-generating agent. While the form of the copolymerization is not limited, solvent polymerization in the presence of a solvent is easily conducted and affords good results. Examples of such solvents are aromatic hydrocarbons such as toluene or xylene, ketones such as methyl ethyl ketone or acetone, and alcohols such as n-butanol or cyclohexanol. The kind of the radical-generating agent and the proportion thereof used are similar to those in the case of polymerization of usual acrylic acid esters or methacrylic acid esters. For example, a radical-generating agent such as benzoyl peroxide or azobisisobutyronitrile is used in a proportion of 0.2 to 2% by weight based on the total weight of the monomers for the composition, and the copolymerization is carried out at a temperature of 60° C. to 120° C. depending on the half-life of the agent. In the copolymerization, the total quantity of the monomers of the four groups may be mixed together at a time for copolymerization, or a part of the monomer mixture may be additionally fed to other monomers or the monomer mixture during the copolymerization.

As to the extent of the polymerization of the acrylic resin composition of the present invention, the composition is preferred to have a viscosity at 25° C. of 100 to 2,000 cp, preferably 150 to 1,000 cp in the case of xylene solvent and a resin content of 40% by weight. The copolymers within this viscosity range have a weight average molecular weight in the range of 5,000 to 30,000 in terms of values according to gel permeation chromatography. The adjustment of polymerization degree is carried out depending on the quantity of radical-generating agent or chain transfer agent used, as in the case of production of usual acrylic resins. If the above viscosity is less then 100 cp, unpolymerized monomers are liable to remain, and since the viscosity of the composition is too low, its operability as coating material cannot be regarded as good, while if the viscosity exceeds 2,000 cp, then due to its too high viscosity, the operability is not only inferior, but also there is a tendency that the hot water resistance and corrosion resistance of the resulting coating after coated lower.

In the above manner, a copolymer as the thermoset acrylic resin composition for coating metallic materials, of the present invention is obtained. The solvent used at the time of copolyemrization may be contained in the resulting composition as it is, or may be recovered by heating under reduced pressure or the like means, together with unreacted monomers of the above groups (a)–(d).

The acrylic resin composition of the present invention may be subjected to crosslinking reaction for thermosetting, by utilizing the functional group contained in the compounds of group (b). As the crosslinking agent or reaction promotor therefore, organic acids or organic base compounds as described below are used in a proportion of 0.1 to 5% by weight, preferably 0.5 to 3% by weight based on the weight of the acrylic resin composition.

Concrete examples of such organic acids are acrylic acid, methacrylic acid, phthalic acid, maleic acid or p-toluenesulfonic acid. Acrylic acid or methacrylic acid may be added at the same time as that of copolymerization for producing the acrylic resin composition of the present invention and copolymerized. Other organic acids are added after the preparation of the composition.

Examples of the above organic base compounds are benzyldimethylamine, polyamines, polyamides, etc. which are used as a catalyst for epoxy group ring opening relative to the compounds of group (b). However, certain amino group-containing silane compounds may be more preferably used, such as γ-aminopropyltriethoxysilane, 3-(2-aminoethyl)aminopropyltrimethoxysilane or 3-(2-aminoethyl)aminopropylmethyldimethoxysilane. These organic base compounds are added and mixed after preparation of the acrylic resin composition of the present invention. Examples of other curing promoters are bases, salts or acids such as potassium hydroxide, tetramethylammonium hydroxide, sodium acetate, phosphoric acid, toluenesulfonic acid. However, from the viewpoint of the chemical stability of the catalyst itself, organometallic compounds such as dibutyltin oxide or tetrabutyl tin may be preferably used.

When the composition of the present invention is used as the coating material for coating metals, various kinds of auxiliary agents blended in paints of similar kinds of resins may be used, such as organic or inorganic pigment, dyestuff, UV light absorber, dispersing agent, sagging-preventing agent, etc. As to the above dyestuff and pigment, if importance is attached to the weather resistance of the coating, use of pigment is preferred. Further if importance is attached to the transparency of the coating colored by pigment addition, pigment particles are ground into finely-divided particles of $2\mu$ or less, preferably $1\mu$ or less, by various kinds of paint shakers such as ball mill, centrimill, sand grind mill, and the particles are dispersed in the coating material and used. The fact that the coating material of the present invention has a good pigment-dispersibility is one of its specific features. If transparency is not particularly required, a pigment for general purpose may be dispersed, as it is, in the coating material and used. Further, in order to improve the coating operability or finishing properties, a solvent such as xylene, butyl acetate, ethylcellosolve, butanol or 2-butanone may be blended in a suitable amount.

As for the method for coating the metal surface with the coating material of the composition of the present invention, any of conventional methods may be employed such as curtain flow coating, roll coating, spraying, dipping, etc. The resulting coating has a thickness as extremely low as 2 to $15\mu$, and nevertheless its specific features can be fully exhibited after curing described later.

The product of the present invention which is a thermoset silicone-modified acrylic resin composition, is cured by heating after formation of the coating. The coating is cured at 150° to 280° C., preferably 200° to 270° C. and in a short time such as one to 30 minutes, preferably 3 to 15 minutes. Another curing method is the following low temperature curing:

The coating of the composition of the present invention contains an alkoxysilane and a reaction promotor such as organic acid or organic base, and crosslinking reaction gradually even at low temperatures such as room temperature to 60° C.; hence such a low temperature curing method can be easily utilized for woodworking, for repairing building structures or automobiles or for other purposes.

When the acrylic resin composition of the present invention is used at the coating, a coating having a high degree of crosslinking is obtained, and this coating is superior in adhesion and processing-resistance notwithstanding its high hardness. The reason is presumed to consist in the following three points:

1 When the blending ratio of acrylic acid ester or methacrylic acid ester to the vinyl group-containing polysiloxane both as raw materials for the acrylic resin composition, and the polymerization degree of the composition copolymer are adequately choiced, ultimately the flexibility and hardness of the coating can be adequately retained.

2 The vinyl group-containing silane compound as one of the copolymerization components forms siloxane bond, bond to hydroxyl group and chemical or physical bond to metals to be coated.

3 The organic acid or organic base compound added to the composition promotes crosslinking reaction.

The present invention in one aspect relates to a stainless steel material having a cured coating comprising siloxane bonds as its skeleton, formed by coating the surface of the stainless steel material with a coating material mainly of a silicone-modified acrylic resin, followed by thermosetting.

As to the stainless steel used, its composition and surface-adjustment method have no particular limitation. However, in order to assure the adhesion of the coating, dirts such as oil matters, dusts, etc. are preferably removed by washing in advance, as described later.

The modified acrylic resin coating material of the present invention may be naturally applied also to steel materials or aluminum materials. Nevertheless, the reason that the object of the coating of the present invention has been limited to stainless steel materials is that none of general coatings including known acrylic resin coatings could have fully satisfied all of weather resistance, rust prevention, hardness and adhesion relative to stainless steel materials.

Products of stainless steel materials have generally been surface-adjusted and as the method therefor, for example, BA (Bright Annealing), 2B (annealing and acid washing followed by being subjected to skinpass roll), buffing, hairline polishing (HL), etc. have been conducted.

Figure 1:
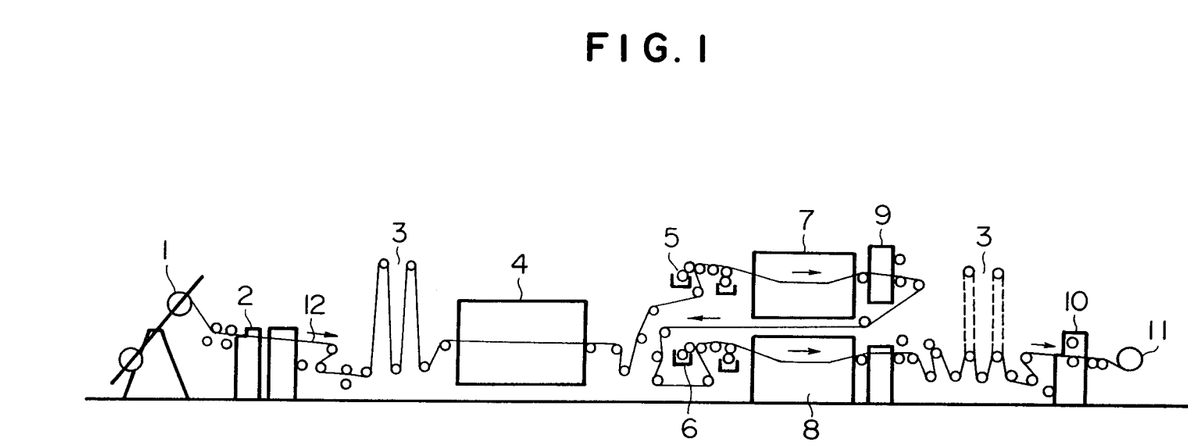
FIG. 1 shows a roll coater apparatus as an example of the coating apparatus used in the present invention.

For the stainless steel materials used in the present invention, the above surface-adjustment is not indispensable. However, if dirts such as oil matters, dusts, etc. are attached onto the surface of the materials, at the time of adjustment or preservation of the materials prior to coating, then it is preferred to carry out degreasing and washing (e.g. solvent washing with trichlene or the like) or alkali washing. As to the method of coating with the modified acrylic resin of the present invention, it is possible to employ any of roll coater method, blade coater method, gravure coater method, beat coater method, curtain flow coater method, dip coater method, and spray coater method, and as an example, a roll coater apparatus is illustrated in FIG. 1.

In this FIGURE, numeral 1 represents payoff reel; 2, welding machine for connecting coils; 3, accumulator; 4, pretreating means for degreasing and washing; 5, No. 1 roll coater; 6, No. 2 roll coater; 7, No. 1 baking furnace; 8, No. 2 baking furnace; 9, cooling means after coating and baking; 10, cutter; 11, coil winder after completion of coating and baking; and 12, coil to be coated.

The above apparatus is an apparatus wherein a bandform steel sheet is continuously coated and baked, and No. 1 roll coater (5) and No. 1 baking furnace (7); and No. 2 roll coater (6) and No. 2 baking furnace (8) are paired, respectively, that is, the so-called 2 coats and 2 bakes are possible.

When the coating and baking in the present invention are carried out using the apparatus, the above No. 2 roll coater (6) is not always required.

In short, band-form stainless steel sheets 12 fed from payoff reel 1 are continuously connected by welding machine 2, and degreased with an alkali and washed by pretreating means 4 in advnace of coating, followed by coating coil to be coated 12 by No. 1 roll coater 5 so as to give a desired thickness of coating, baking in No. 1 baking furnace 7 and No. 2 baking furnace 8, cooling at cooling means 9, cutting by cutter 10 into coil units and winding up by coil winder 11.

As to the baking conditions, i.e. thermosetting conditions, temperature and time are in a relative relationship and also the conditions vary depending on the properties of coating required. However, the baking is possible in a temperature range of 100° to 350° C. and in a broad period range of one hour to 0.5 minute. As to preferable baking conditions under which baking is more easily carried out are those under which the material to be coated is baked for a relatively short time of 1 to 10 minutes in an atmosphere heated to 150° to 300° C. However, conditions under which the heating time is somewhat prolonged, e.g. heating at 150°–250° C. for 10–60 minutes, make it possible to further improve the properties of the coating of the present invention.

The above fact also means that when coated band-form steel or the like of the present invention is brought into maas production, it is possible to improve the properties of the coating by re-baking after baking as follows:

For example, when a coated stainless steel material first baked at 250° C. for 1–5 minutes is reheated e.g. to 220° C. for 20 minutes, it is possible to produce the steel material having further improved properties without harming mass-productivity.

The thickness of the coating of the present invention is preferably in the range of 1 to 30μ. If it is less than 1μ, an interference fringe is observed on the surface of the coating; hence this is undesirable in respect of appearance, while even if it exceeds 30μ, the properties of the coating is not improved, but, to the contrary, when the stainless steel materials are subjected to a great extent of processing, there is such a tendency that the coating is liable to peel off.

The characteristic effectiveness of the present invention is in that even when the coating is extremely thin, a sufficient corrosion resistance is exhibited. Namely, in the case of coatings formed by general paints, unless the coating has a considerable thickness e.g. 30μ or more, there is such a drawback that a coating-lacking part is liable to occur, whereas in the case of the present invention, even when the thickness of the coating is only several μ as above, it is possible to retain the properties of coating.

In the present invention, as has been described above in details, since a specific coating of organic and inorganic substances is formed on the surface of stainless steel piece, the resulting product of the present invention has the following specific features as compared with conventional acrylic resin coating or anode-oxidized coating:

(1) Since the coating is superior in pigment-dispersibility, excellent transparency is easily obtained and a lustrous coloration of stainless steel tone is exhibited.

(2) Since the coating has a surface hardness as high as 2H or more, it is hardly injured.

(3) The coating has a superior weather resistance.

(4) The coating has a superior adhesion.

(5) The coating has a good corrosion resistance.

(6) The coating has a good chemical resistance.

(7) Through roll processing, press processing, etc., the coating does not peel off.

(8) The color tone does not vary depending on the direction of view.

(9) The coating is superior in resistance to fingerprint-contamination and resistance to oil contamination.

(10) It is possible to prepare the coating economically.

Due to the above specific features, the product of the present invention makes it possible to extend the degree of freedom of design relative to color specification of coating materials, to a larger extent than conventional products. Further, since it is possible to subject stainless flat sheet or coil after surfacetreated, to forming-processing, various effects on the final product are obtained such as energy saving, reduction in rejection rate, reduction in cost, etc.

Next, the first aspect of the present invention will be described in more detail by way of Preparation examples and Use examples.

PREPARATION EXAMPLE 1

Methyl methacrylate (50 parts by weight; the succeeding parts being all by weight), butyl methacrylate (10 parts), glycidyl methacrylate (20 parts), acrylic acid (2 parts), vinyl-terminated polydimethylsiloxane ($\eta$=50) (10 parts) and γ-methacryloxypropyltrimethoxysilane (10 parts) were dissolved in xylene (150 parts), and benzoyl peroxide (one part) was added, followed by reacting the mixture in nitrogen stream at 100° C. for 4 hours, to obtain a silicone-modified acrylic polymer having a viscosity at 25° C. of 210 cp, indicated in Table 1.

PREPARATION EXAMPLES 2–8

Preparation example 1 was repeated except that the components and composition were varied, to obtain silicone-modified acrylic polymers having viscosities at 25° C. indicated in Table 1.

USE EXAMPLES 1–6 AND COMPARATIVE EXAMPLES 1–2

The respective polymers obtained in Preparation examples 1–8 were diluted by the equal weight of a mixed solvent of xylene-butanol (2:1), applied onto a stainless steel sheet (SUS 430, planished) and subjected to heat setting at 230° C. for 5 minutes to obtain coatings of 5–6 μ thick, followed by evaluation. The results are shown in Table 2.

TABLE 1

| Preparation Example | 1 | 2 | 3 | 4 | 5 | 6 | 7 | 8 |
|---|---|---|---|---|---|---|---|---|
| a MMA | 50 | 40 | 50 | 60 | 50 | 30 | 60 | 50 |
| BMA | 10 | 10 | | | | 20 | 10 | |
| EA | | 10 | | | | | | |
| LMA | | | 10 | | 20 | 20 | | 20 |
| b GMA | 20 | 10 | 10 | | 20 | 20 | 20 | 20 |

TABLE 1-continued

| Preparation Example | 1 | 2 | 3 | 4 | 5 | 6 | 7 | 8 |
|---|---|---|---|---|---|---|---|---|
| HEMA | | 10 | | 10 | | | | |
| c Vinylpolysiloxane | 10 | 10 | | 20 | 1 | 0.1 | 20 | |
| Methacrylpolysiloxane | | | 10 | | | | | |
| d MOPS-U | 10 | | 10 | 10 | 10 | 10 | | 10 |
| VTS-U | | 10 | | | | | | |
| Acrylic acid | 2 | 1 | | | 1 | 1 | 1 | 1 |
| Maleic acid | | | 2 | 1 | | | | |
| BPO | 0.5 | 0.5 | 0.5 | 0.5 | 1 | 1 | 0.5 | 0.5 |
| Xylene | 150 | 150 | 150 | 150 | 150 | 150 | 150 | 150 |
| Solution viscosity (25° C.) | 210 | 385 | 190 | 220 | 420 | 530 | 240 | 310 |

Note:
MMA: Methyl methacrylate
BMA: n-Butyl methacrylate
EA: Ethyl acrylate
LMA: Lauryl methacrylate
GMA: Glycidyl methacrylate
HEMA: 2-Hydroxyethyl methacrylate
Vinylpolysiloxane: Vinyl-terminated polydimethyl-siloxane ($\eta = 50$)
Methacrylpolysiloxane: Methacryloxypropyl- terminated polydimethylsiloxane ($\eta = 200$)
MOPS-U: Methacryloxypropyltrimethoxysilane
VTS-U: Vinyltrimethoxysilane

TABLE 2

| | Use example | | | | | | Comparative example | |
|---|---|---|---|---|---|---|---|---|
| | 1 | 2 | 3 | 4 | 5 | 6 | 1 | 2 |
| Preparation example No. | 1 | 2 | 3 | 4 | 5 | 6 | 7 | 8 |
| Pencil hardness | 2H | 3H | 2H | 2H | 3H | 3H | B | 2H |
| Adhesion | o | o | o | o | o | o | x | o |
| Processability (at 180° C.) | o | o | o | o | o | o | o | x |
| Anticorrosion (SST 200 hr) | o | o | o | o | o | o | Δ | o |
| Hot water resistance | o | o | o | o | o | o | x | o |

In the above Table 2, the evaluation methods are as follows:
Judgement:
  o No change in appearance was observed.
  Δ Changes (cracks, blushing, etc.) were somewhat observed.
  × Changes (cracks, blushing, etc.) were clearly observed.
Pencil hardness: Measured according to JIS-K-5400.
Adhesion: After cross-cut adhesion test according to JIS-K-5400, peel test was five times carried out with cellophane tape.
Processability: Test piece was folded by 180° with a vise and folded part was judged with naked eyes.
Corrosion resistance: Test piece was subjected to cross-cut and bending processings (2 φ 180° folded), followed by saline solution spray test (according to JIS Z 2371) for 200 hours to observe appearance change such as occurrence of rust, blister, etc.
Hot water resistance: Test piece was cross-cut and immersed in boiling water for 2 hours, followed by cellophane tape peel test.

Next, Coating material preparation examples directed to the second aspect of the present invention will be described.

COATING MATERIAL PREPARATION EXAMPLES 1-1 and 1-2

Methyl methacrylate (40 parts by weight; the succeeding parts being all by weight), n-butyl methacrylate (10 parts) and ethyl acrylate (10 parts) (the total of the above parts: 60 parts) were mixed with glycidyl methacrylate, 2-hydroxyethyl methacrylate, a two vinyls-terminated dimethylpolysiloxane (viscosity: 50 cp) and methacryloxypropyltrimethoxysilane, each 10 parts, as modifying monomers, and acrylic acid (0.5 part) and benzoyl peroxide (0.5 part), to prepare a mixed solution of monomers for polymerization. This mixed solution was dropwise added to xylene (150 parts) kept at 100° C. to effect copolymerization reaction and thereby finally obtain a silicone resin-modified acrylic resin solvent solution having a solution viscosity at 25° C. of 340 cp (resin concentration: 40% by weight).

To this solution was added a mixed solvent of xylene-butanol (ratio by weight, 1:1) to make the resin content 30%, followed by adding a UV light absorber (0.5% by weight based on the resin content), and further adding and mixing either one of the following two kinds of coloring pigments (each 2.5% by weight based on the resin content):

Transoxide Red (tradename of product made by Dainichi Seika Kogyo Company) having a particle diameter of 1μ or less (Coating material preparation example 1-1) (a red coating material was obtained; and Cyan Blue-5050 (tradename of product made by Dainichi Seika Kogyo Company) having a particle diameter of 1μ or less (Coating material preparation example 1-2) (a blue coating material was obtained).

COATING MATERIAL PREPARATION EXAMPLES 2-1 and 2-2

Preparation of a mixed solution of monomers for polymerization, and copolymerization reaction were carried out under the same conditions as in coating material preparation examples 1-1 and 1-2 except that as the monomers for copolymerization, lauryl methacrylate (19 parts) was used in place of ethyl acrylate and two methacryls-terminated dimethylpolysiloxane (one part, viscosity 200 cp), in place of tow vinyls-temrinated dimethylpolysiloxane, to obtain a silicone resin-modified acrylic resin solvent solution having a solution viscosity at 25° C. of 600 cp.

To this solution were added solvent, UV light absorber and pigment in the same manner as in coating material preparation examples 1-1 and 1-2 to obtain a red coating material and a blue one.

USE EXAMPLES 7-13 AND COMPARATIVE EXAMPLES 3-4

The coating of the present invention was baked on a stainless steel sheet under various conditions indicated in the following Table 3 and according to the notes described below the Table, followed by evaluating the properties of the resulting coatings for comparison.

TABLE 3

| Experiment No. | Coating thickness μ | Setting conditions °C., min. | Pencil hardness | Color tone | Cross-cut, Erichsen's peeling |
|---|---|---|---|---|---|
| Compar. ex. 3 | 0.5 | 300, 1 | 2H | Slight interference fringe | o |
| Compar. ex. 4 | 0.5 | 200, 5 | 2H | " | " |
| Use example 7 | 5~6 | 300, 1 | 3H | Uniform | " |
| Use example 8 | " | 220, 5 | 2H | " | " |
| Use example 9 | 15 | 300, 1 | 4H | " | " |
| Use example 10 | " | 220, 5 | 3H | " | " |
| Use example 11 | 24 | 300, 1 | 4H | " | Δ |
| Use example 12 | " | 220, 5 | 3H | " | o |
| Use example 13 | 30 | 220, 5 | 3H | " | Δ |

Note:
(1) Substrate: SUS 304 BA, 0.4 mm thick.
(2) Application method: according to immersion method, and bar coater was used.
(3) Coating material: prepared according to Coating material preparation example 1-1.
(4) Setting conditions: temperature-temperature inside the furnace: time-time during which the material is retained inside the furnace.
(5) Cross-cut, Erichsen's peel test: cross-cut in 1 mm mesh, Erichsen 5 mm extruded and subjected to peel test with cellophane tape.
o-no peel; Δ-slight peel.

As apparent from Table 3, when the coating thickness is less than 1μ, an interference fringe is observed, and when it is 24μ, a slight peel is observed in the crosscut, Erichsen's cellophane peel test; thus the coating thickness was judged to be suitably in the range of 1 to 30μ. Further, as to the setting conditions, it is apparent that a short time treatment such as 3 minutes at 220° C.-one minute at 300° C. affords a sufficient coating-formability.

USE EXAMPLES 14–17 AND COMPARATIVE EXAMPLES 5-6

As the stainless substrate, SUS 304 DF (Dull Finish, satin texture) or HL (Hair Line Finish) was used; the thickness of coating material polished and baked was varied; and non-bent or 90° bent product was exposed to atmospheric air to compare the presence or absence of rust formation with that of a stainless substrate having no coating material applied thereon.

The test conditions and the results are shown in the following Table 4.

TABLE 4

| Experiment No. | Kind of Substrate | Bent or non-bent | Exposed days 20 days Coating thickness 8μ | 24μ | 60 days Coating thickness 8μ | 24μ |
|---|---|---|---|---|---|---|
| Use ex. 14 | SUS 304 DF | non-bent | o | o | o | o |
| Use ex. 15 | " | Bent, 90° | " | " | " | " |
| Use ex. 16 | SUS 304 HF | non-bent | " | " | " | " |
| Use ex. 17 | " | Bent, 90° | " | " | " | " |
| Compar. ex. 5 | SUS 304 DF | non-bent | — | x | — | x |
| Compar. ex. 6 | SUS 304 HL | " | — | x | — | x |

Note
Coating material: prepared according to Coating material preparation example 1-1.
Setting conditions: 220° C., 5 min.
Evaluation: o-no rust, x-rusted. Non-coated SUS 304 DF and HL both rusted through 20 days' exposure.

As apparent from Table 4, the product of the present invention does not rust even under the conditions of exposure to atmospheric air where the substrate rusts, and the coating of the present invention retains rust-preventive function even through 90° bending processing.

USE EXAMPLES 18-22 AND COMPARATIVE EXAMPLE 7

As the stainless substrate, SUS 430 BA (0.5 mm thick) was used; as the coating material, the product obtained in Coating material preparation example 2-1 was used; and the setting conditions of the coating material of the present invention and the bending processability of the resulting coating depending on the coating thickness were observed.

Baking conditions and the presence or absence of abnormality at the R part of the resulting baked coating are shown in Table 5.

TABLE 5

| Experiment No. | Baking temp. | time | Bent angle 90° Coating thickness 8μ | 24μ | 180° Coating thickness 8μ | 24μ |
|---|---|---|---|---|---|---|
| Compar. ex. 7 | 200° C. | 10 min. | o | Δ | Δ | Δ |
| Use ex. 18 | " | 15 min. | o | o | o | o |
| Use ex. 19 | 250° C. | 3 min. | o | Δ | Δ~o | Δo |
| Use ex. 20 | " | 5 min. | o | o | o | o |
| Use ex. 21 | 300° C. | 2 min. | o | o | o | o |
| Use ex. 22 | " | 5 min. | o | o | o | o |

Note
Judgement: After roll bending processing at R = 2t, R part was outwardly observed.
o:-no abnormality;
Δ:-R part, slightly white-turbid,
x:-R part, white-turbid.

As seen from Table 5, the coating of the present invention exhibits almost generally good results even in the case of 180° roll bending processing, and as to the heating time for baking, 10 minutes or more at 200° C., 3 minutes or more at 250° C. and 2 minutes or more at 300° C. were adequate, but a slight interference color was observed at a baking time of 8 mintues at 300° C.; hence shorter than 8 minutes are preferred.

USE EXAMPLES 23-26 AND COMPARATIVE EXAMPLES 8-9

As the substrate, SUS 430 BA or SUS 304 HL was used; as the coating material, products of coating material preparation examples 1-1 and 1-2, a commercially available acrylic resin and a product of oxidation method were used; baking was carried out varying the setting conditions and the coating thickness; and the performances of the resulting coated sheets directed to the following items were evaluated. The coating conditions and the results are shown in Table 6.

The evaluation method was conducted according to the following three-stage method:

o: Abnormalities such as peel, stain, crack, etc. were not observed at all.

Δ: Slight abnormalities were observed.

×: Abnormalities were clearly observed.

1 Rust resistance: Artificial seawater spray (20° C. one minute) followed by infrared ray lamp drying were carried out and the resulting appearance was evaluated.

2 Formability: 90° bending and 180° bending at R=2t were carried out, and thereafter a cellophane tape peel test upon the resulting bent part was carried out; the resulting appearance was evaluated.

3 Chemical resistance: Immersed in a mixed solution of 28% HCl and 3% $H_2O_2$ water for 30 seconds. The resulting appearance was evaluated.

4 Saline solution resistance: Immersed in 3% NaCl aqueous solution kept at 50° C. for 144 hours, followed by water-washing and thereafter a cellophane tape peel test. The resulting appearance was evaluated.

5 Alkali resistance: Immersed in 0.5% NaOH aqueous solution kept at 50° C. for 144 hours. The resulting appearance was observed.

6 Coin scratch resistance: The surface of the coated sheet was injured with 10 yen coin, and the resistance was designated in a four-stage manner (A (good)-(bad)), depending on the extent of injury.

7 Trichlene resistance: Cotton cloth was immersed in trichloroethylene and the surface of the coated sheet was rubbed definite times with the cloth. The resulting appearance was evaluated.

8 Weather resistance: Test was carried out according to the accelerated weather resistance test of JIS K 5400, and the appearance and the degree of reflection (Q=60°) were measured.

TABLE 6

|  | Use example | | | | Compar. ex. | |
| --- | --- | --- | --- | --- | --- | --- |
|  | 23 | 24 | 25 | 26 | 8 | 9 |
| Substrate[1] | BA | HL | BA | HL | HL | BA |
| Coating material[2] | 2-1 | 2-2 | 2-1 | 2-1 | Acryl | Oxidation |
| Setting conditions[3] | | | | | | |
| °C. min. | 1 | 2 | 2 | 2 | 4 | |
| °C. min. | | | +3 | +3 | | |
| Coating thickness μ | 5 | 6 | 5 | 6 | 20 | 0.1 |
| Color tone appearance | Good | → | → | → | → | * |
| Pencil hardness H | 5 | 3 | 5 | 5 | 2 | 3~9 |
| Rust resistance: | | | | | | |
| non-processed part | o | o | o | o | o | x |
| processed part, 90° bent | o | o | o | o | o | x |
| processed part, 180° bent | o | Δ | o | o | Δ | x |
| Formability: | | | | | | |
| R = 90° | o | o | o | o | o | o |
| R = 180° | o | Δ | o | o | Δ | o |
| Chemical resistance | o | o | o | o | o | x |
| Saline solution: | | | | | | |
| flat sheet | o | o | o | o | x | o |
| cross-cut | o | o | o | o | x | o |
| Alkali resistance: | | | | | | |
| flat sheet | o | o | o | o | x | o |
| cross-cut sheet | o | o | o | o | x | o |
| Coin scratch resistance | B | C | A | A | B | A |
| Trichlene resistance: | | | | | | |
| rubbing 30 times | o | Δ | o | o | o | o |
| rubbing 90 times | o | x | o | o | o | o |
| Weather resistance[4], appearance | o | o | o | o | x | o |
| 2500 Hr degree of reflection | ± | ± | ± | ± | −4 | ± |

Note
[1]BA and HL represent SUS 430 BA and SUS 304 HL, respectively.
[2]2-1, 2-2, acryl and oxidation represent Coating material examples 2-1, 2-2, acrylic resin and oxidation method, respectively.
[3] 1 , 2 , 3 and 4 represent 6 min. at 250° C., 2 min. at 230° C., 20 min. at 220° C. and 3 min. at 180° C., respectively.
[4]± represents no change and −4 represents 4% reduction in 600 hours.
*Visual color tone changed.

What we claim is:

1. A thermoset acrylic resin composition for coating metallic materials, obtained by subjecting to radical copolymerization, the following monomers (a)–(d), each specified and each in a definite proportion by weight based on the total weight of the monomers (a)–(d):

(a) at least one of compounds selected from the group consisting of acrylic acid esters and methacrylic acid esters, both the esters having 1 to 12 carbon atoms in the ester group moiety, in a proportion of 40 to 80% by weight;

(b) at least one of compounds selected from the group consisting of hydroxyl group- or epoxy group-containing acrylic acid esters and hydroxyl group- or epoxy group-containing methacrylic acid esters, each in a proportion of 20 to 5% by weight;

(c) a vinyl group-containing polysiloxane in a proportion of 20 to 0.01% by weight; and (d) a vinyl group-containing silane compound in a proportion of 20 to 2% by weight.

2. A composition according to claim 1 wherein 0.1 to 5% by weight of an organic acid having 3 or more carbon atoms is further blended with the mixture of said monomers.

3. A composition according to claim 1 wherein the copolymer obtained by the radical copolymerization has a weight average molecular weight of 5,000 to 300,000.

4. A composition according to claim 2 wherein said organic acid is acrylic acid or maleic anhydride.

5. A composition according to claim 1 wherein said vinyl group-containing polysiloxane is at least one of compounds selected from the group consisting of the following monomers (e)–(h):

(e) vinyl group-terminated polyalkylsiloxanes having a viscosity at 25° C. (η) of 2 to 100,000 cp and the following structural formula:

wherein n represents a positive integer;

(f) polydimethyl-polymethylvinylsiloxane copolymers having a η of 10 to 100,000 cp at 25° C. and the following structural formula wherein m and n each represent a positive integer;

(g) methacryloxypropyl group-terminated polydimethylsiloxanes having a viscosity at 25° C. (η) of 5 to 100,000 cp and the following structural formula:

wherein n represents a positive integer;

(h) polydimethyl-methacryloxypropylmethylsiloxanes having a viscosity at 25° C. (η) of 10 to 100,000 cp and the following structural formula:

wherein n represents a positive integer; and compounds having phenyl group substituted for a part of —(CH$_3$)$_2$ in Si—(CH$_3$)$_2$ group in said (e)–(h).

6. A stainless steel piece having thereon a coating comprising a modified acrylic resin as an active ingredient, prepared by subjecting to radical copolymerization ① 20 to 2% by weight of a vinyl group-containing alkoxysilane, ② 20 to 0.01% by weight of a vinyl group-containing polysiloxane, ③ 20 to 5% by weight of a hydroxyl group- or epoxy group-containing acrylic acid ester or methacrylic acid ester and 40 to 80% by weight of ④ an acrylic acid ester having 1 to 12 carbon atoms in the ester group moiety or ⑤ a methacrylic acid ester having 1 to 12 carbon atoms in the ester group moiety, in the presence of 0.1 to 5% by weight of an organic acid having 3 or more carbon atoms, the respective % by weight being based on the total weight of the monomers ①–⑤, and baked at a temperature of 100° to 350° C.

7. A stainless steel piece according to claim 6 wherein said coating has a thickness of 1 to 30μ.

8. A stainless steel piece according to claim 6 wherein a pigment having an average particle diameter of 2μ or less is contained in said coating.

9. A stainless steel piece according to claim 6 wherein the coating after forming-processed is again baked at a temperature of 100 to 300° C.

* * * * *